United States Patent [19]

Kawamura

[11] Patent Number: 5,912,714
[45] Date of Patent: Jun. 15, 1999

[54] CLOCK GENERATOR FOR A VIDEO SIGNAL PROCESSING APPARATUS

[75] Inventor: Yasunori Kawamura, Kyoto, Japan

[73] Assignee: Rohm Co., Ltd., Kyoto, Japan

[21] Appl. No.: 08/869,211

[22] Filed: Jun. 4, 1997

[30] Foreign Application Priority Data

Jun. 7, 1996 [JP] Japan ..................................... 8-145363

[51] Int. Cl.[6] ................................ H04N 7/01; H04N 5/46
[52] U.S. Cl. ............................ 348/555; 331/10; 348/441; 348/446
[58] Field of Search ..................................... 348/446, 441, 348/555, 453, 510, 536, 540, 542, 550; 331/10

[56] References Cited

U.S. PATENT DOCUMENTS

| | | | |
|---|---|---|---|
| 4,661,844 | 4/1987 | Rufray et al. | 348/555 |
| 5,111,160 | 5/1992 | Hershberger | 331/20 |
| 5,268,654 | 12/1993 | Furutani et al. | 331/10 |
| 5,334,952 | 8/1994 | Maddy et al. | 331/10 |
| 5,467,141 | 11/1995 | Ligertwood | 348/555 |
| 5,473,386 | 12/1995 | Helfrich et al. | 348/555 |

*Primary Examiner*—Victor R. Kostak
*Attorney, Agent, or Firm*—Nikaido, Marmelstein, Murray & Oram LLP

[57] ABSTRACT

A signal processing apparatus has a clock generator that generates a clock in accordance with the rate at which picture elements are scanned. The clock generator includes a first frequency divider for dividing the output frequency of a voltage-controlled oscillator for generating the clock, a second frequency divider for dividing the output frequency of a reference frequency oscillator, a phase comparator for comparing phases between the outputs of the first and second frequency dividers, means for applying the output of the phase comparator to the reference frequency oscillator as a control signal, and a third frequency divider for performing voltage division on the output of the voltage-controlled oscillator to obtain the clock. The clock obtained has a frequency determined as:

$$f_x \times \frac{M}{N \cdot P}$$

where M, N, and P represent the frequency-division ratios of the first, second, and third frequency dividers, respectively, and $f_x$ represents the reference frequency.

6 Claims, 4 Drawing Sheets

CLOCK GENERATOR FOR A VIDEO SIGNAL PROCESSING APPARATUS

BACKGROUND OF THE INVENTION

1. Field of the Invention

The present invention relates to a clock generator that is used in a video signal processing apparatus for processing a television signal conforming to the NTSC (National Television System Committee) and PAL (phase alternation by line) systems in order to generate a clock (hereinafter referred to as a pixel clock) for determining the rate at which picture elements (pixels) are scanned.

2. Description of the Prior Art

As a video signal processing apparatus, consider, for example, an apparatus for scanning an image. In such an apparatus, while an image is scanned, the image is broken up into a number of picture elements, and the signal values representing each picture element are extracted through a predetermined procedure. This type of video signal processing apparatus for scanning an image is provided with a clock generator, so that the signal values of each picture element are extracted in synchronism with a pixel clock generated by the clock generator. However, different television systems, such as the NTSC and PAL systems, require conformity to different standards, and naturally they require different clock frequencies for the pixel clock. For this reason, conventionally, a video signal processing apparatus needs to be provided with separate clock generators to generate different pixel clocks for the two television systems, even if the apparatus itself is designed to be compatible with both television systems.

In a clock generator compatible with the NTSC system, an oscillator uses a crystal resonator having a resonance frequency of, for example, 12.2727 MHz. On the other hand, in a clock generator compatible with the PAL system, an oscillator uses a crystal resonator having a resonance frequency of, for example, 14.7500 MHz.

In a clock generator compatible with the NTSC system, the oscillation frequency 12.2727 MHz equals 780 times the horizontal scanning frequency 15734.264 Hz of the NTSC system. This means that one horizontal scanning line is divided into 780 picture elements aligned horizontally. On the other hand, in a clock generator compatible with the PAL system, the oscillation frequency 14.7500 MHz equals 944 times the horizontal scanning frequency 15,625 Hz of the PAL system. This means that one horizontal scanning line is divided into 944 picture elements aligned horizontally.

However, these conventional clock generators require separate crystal resonators and separate oscillators for the NTSC and PAL systems. That is, conventional clock generators cannot achieve scanning for both of the NTSC and PAL systems unless they are provided with two crystal resonators at additional cost.

SUMMARY OF THE INVENTION

An object of the present invention is to provide a clock generator that is capable of generating different pixel clocks for the NTSC and PAL systems by the use of a single crystal resonator.

Another object of the present invention is to provide a video signal processing apparatus employing a clock generator that is capable of generating different pixel clocks for the NTSC and PAL systems by the use of a single crystal resonator.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

<First Embodiment>

Figure 1:
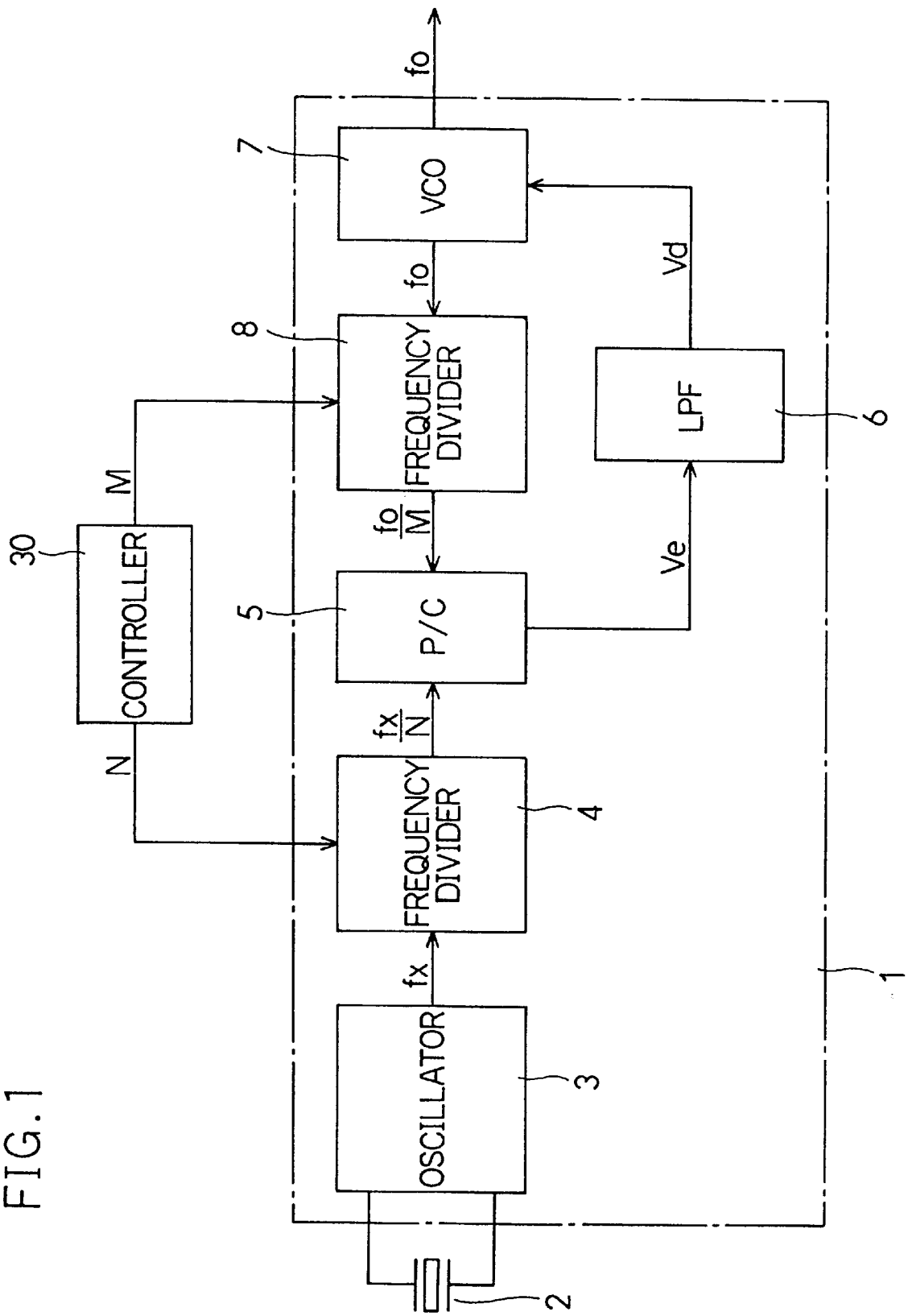
FIG. 1 is a block diagram of the clock generator of a first embodiment of the present invention.

With reference to FIG. 1, a first embodiment of the present invention will be described. FIG. 1 is a block diagram of a clock generator embodying the present invention. This clock generator generates different pixel clocks for the NTSC and PAL systems by the use of a single crystal resonator 2 and a custom PLL (phase-locked loop) integrated circuit 1. Here, it is assumed that the clock frequency fo of the pixel clock is 12.2727 MHz for the NTSC system, and 14.7500 MHz for the PAL system. The PLL integrated circuit 1 incorporates an oscillator 3, frequency dividers 4 and 8, a phase comparator 5, a low-pass filter 6, and a voltage-controlled oscillator 7.

The oscillator 3 is connected to the crystal resonator 2. The oscillator 3 oscillates at a reference frequency fx (for example, fx=15 MHz, as described later) that is equal to the natural frequency of the crystal resonator 2, and outputs a pulse signal having that frequency to the frequency divider 4. The frequency divider 4 converts the signal having the frequency fx into a signal having a frequency fx/N (where N is a whole number). The whole number N is set by a controller 30 provided outside the integrated circuit 1. Next, the phase comparator 5 compares phases between the signal having the frequency fx/N outputted from the frequency divider 4 and a signal having a frequency fo/M outputted from the frequency divider 8. As to the frequency fo/M, a description will be given later.

The phase comparator 5 outputs an error signal Ve that is proportional to the phase difference between the two signals inputted thereto. The error signal Ve is fed to the low-pass filter 6, where it is cleared of its high-frequency components and is converted into a control voltage Vd. The control voltage Vd is then fed to the voltage-controlled oscillator 7.

The voltage-controlled oscillator 7 is a pulse oscillator whose oscillation frequency is controlled by the voltage it receives. Now, suppose that the control voltage Vd causes the voltage-controlled oscillator 7 to oscillate at a frequency fo and output a signal having that frequency fo. The oscillation signal is then converted by the frequency divider 8 into a signal having a frequency fo/M (where M is a whole number), and is fed to the phase comparator 5. The whole number N is set by the controller 30 provided outside the integrated circuit 1. The circuit described heretofore forms a closed-loop circuit that operates to keep the frequency fo/M equal to the frequency fx/N, and consequently the oscillation frequency fo of the voltage-controlled oscillator 7 is stabilized at fo=fx×M/N. Eventually, the PLL integrated circuit 1 outputs a pixel clock having this frequency fo.

To obtain different pixel clocks for the NTSC and PAL systems, the reference frequency fx is set to 15 MHz, for example. The controller 30 provided outside the PLL integrated circuit 1 sets the whole numbers N and M. Specifically, when N=11 and M=9, the oscillation frequency fo is stabilized at 12.2727 MHz, and thus a pixel clock for the NTSC system is obtained; when N=60 and M=59, the oscillation frequency fo is stabilized at 14.7500 MHz, and thus a pixel clock for the PAL system is obtained.

In this way, it is possible to generate different pixel clocks for the NTSC and PAL systems by the use of a single crystal resonator 2. As a result, the clock generator according to the present invention offers compatibility with both of the NTSC and PAL systems at lower cost than conventional clock generators described earlier, since the former requires only one crystal resonator 2 to generate different pixel clocks for the NTSC and PAL systems, in contrast to the latter that require separate crystal resonators for different systems.

<Second Embodiment>

Figure 2:
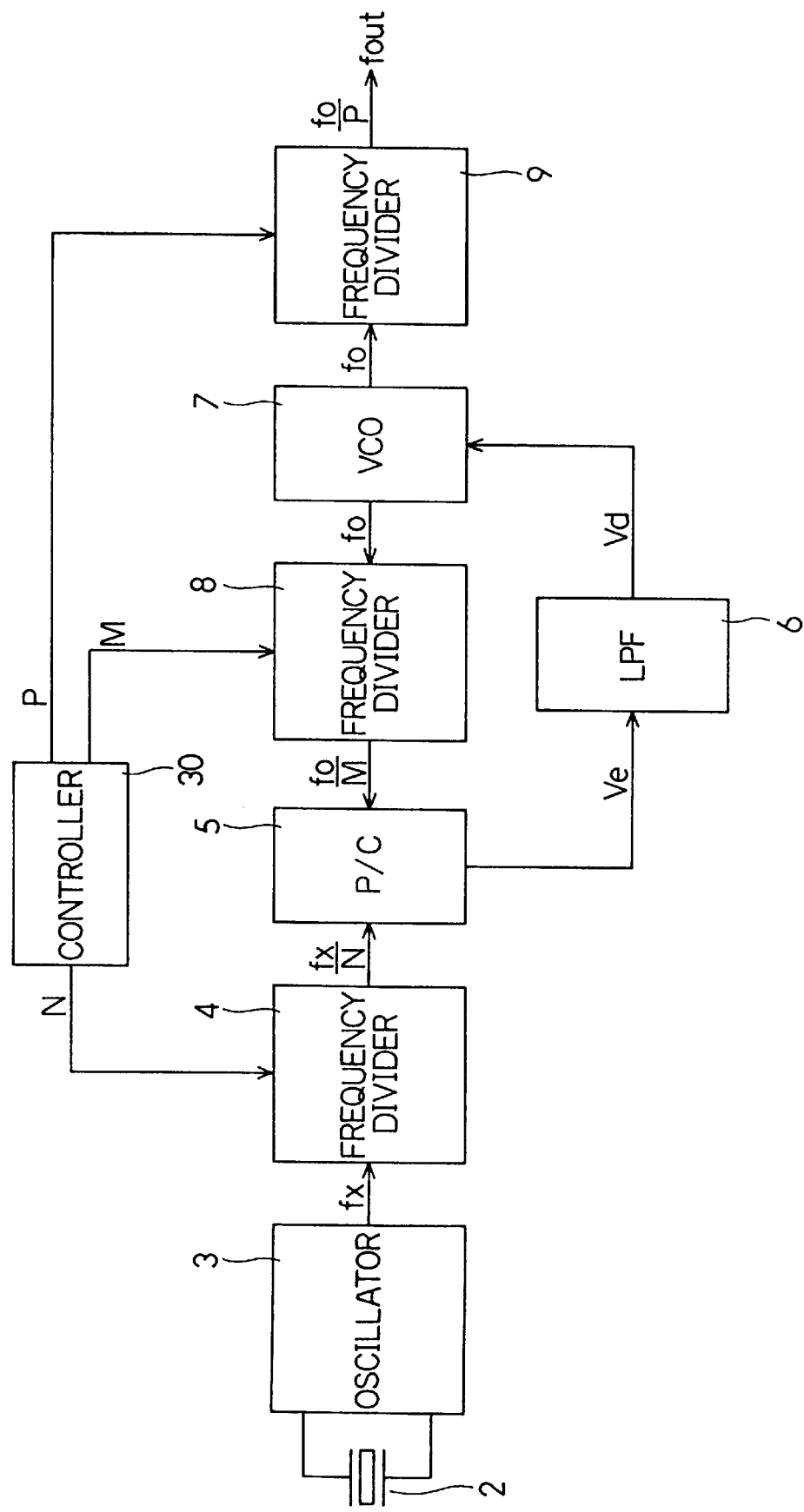
FIG. 2 is a block diagram of the clock generator of a second embodiment of the present invention.

With reference to FIG. 2, a second embodiment of the present invention will be described. FIG. 2 is a block diagram of another clock generator embodying the present invention. The clock generator of this embodiment has almost the same construction as that of the first embodiment, and therefore, in FIG. 2, such components as are found also in FIG. 1 are identified with the same designations, and overlapping descriptions will not be repeated. In this clock generator, a voltage-controlled oscillator 7 outputs a signal having its oscillation frequency fo to a frequency divider 9, which converts the signal into a signal having a frequency fo/P (where P is a whole number), so that, eventually, a pixel clock having a frequency fout is obtained. The whole number P is set by a controller 30.

For the same grounds as in the first embodiment, fo=fx× M/N. Hence, fout=fo/P=fx×M/(N×P). That is, the frequency fout is determined by the combination of the reference frequency fx and the whole numbers N, M and P.

To achieve proper scanning in the NTSC system, the frequency fout of the pixel clock does not necessarily have to be 12.2727 MHz, but may be any whole number times that frequency. Similarly, to achieve proper scanning in the PAL system, the frequency fout of the pixel clock does not necessarily have to be 14.7500 MHz, but may be any whole number times that frequency. The following table lists some examples of such combinations of the reference frequency fx and the whole numbers N, M, and P that allow the frequency fout to be 12.2727 MHz or a whole number times that frequency, or allow it to be 14.7500 MHz or a whole number times that frequency.

| fx | N | M | P | fout | |
|---|---|---|---|---|---|
| 9 MHz | 11 | 15 | 1 | 12.2727 | MHz |
| 9 MHz | 11 | 30 | 1 | 12.2727 × 2 | MHz |
| 9 MHz | 18 | 59 | 2 | 14.7500 | MHz |
| 9 MHz | 18 | 59 | 1 | 14.7500 × 2 | MHz |
| 10 MHz | 11 | 27 | 1 | 12.2727 × 2 | MHz |
| 10 MHz | 20 | 59 | 1 | 14.7500 × 2 | MHz |
| 18 MHz | 11 | 15 | 1 | 12.2727 × 2 | MHz |
| 18 MHz | 18 | 59 | 2 | 14.7500 × 2 | MHz |
| 18 MHz | 11 | 30 | 1 | 12.2727 × 4 | MHz |
| 18 MHz | 18 | 59 | 1 | 14.7500 × 4 | MHz |

For example, when the reference frequency fx is 9 MHz, setting N=11, M=15, and P=1 gives fout=12.2727 MHz. Here, it should be noted that, as long as M/(N×P)=15/11, any combination of N, M, and P gives fout=12.2727 MHz. For example, setting N=11, M=30, and P=2 also gives fout= 12.2727 MHz. Similarly, even when the oscillation frequency fx is different from in these particular examples, or even when fout =14.7500 is targeted, various combinations of N, M, and P are possible.

The oscillation frequency fx of the oscillator 3 may be set to, other than those listed above, 3 MHz, 4.5 MHz, or 5 MHz. Also in these cases, it is possible to obtain pixel clocks for the NTSC and PAL systems with appropriate combinations of N, M, and P. Of course, the reference frequency fx may be set to any frequency other than those noted above, as long as pixel clocks having desired frequencies can be obtained with appropriate combinations of N, M, and P.

In the second embodiment, it is assumed that the NTSC system requires a pixel clock having a frequency of 12.2727 MHz and the PAL system requires a pixel clock having a frequency of 14.7500 MHz. However, even if the two systems require pixel-clock frequencies different from those noted above, switching between the two systems is possible simply by setting the reference frequency fx and the whole numbers N, M, and P appropriately. Thus, also in this case, it is possible to generate pixel clocks for the NTSC and PAL systems by the use of a single crystal resonator 2, that is, without using two crystal resonators at additional cost.

<Third Embodiment>

Figure 3:
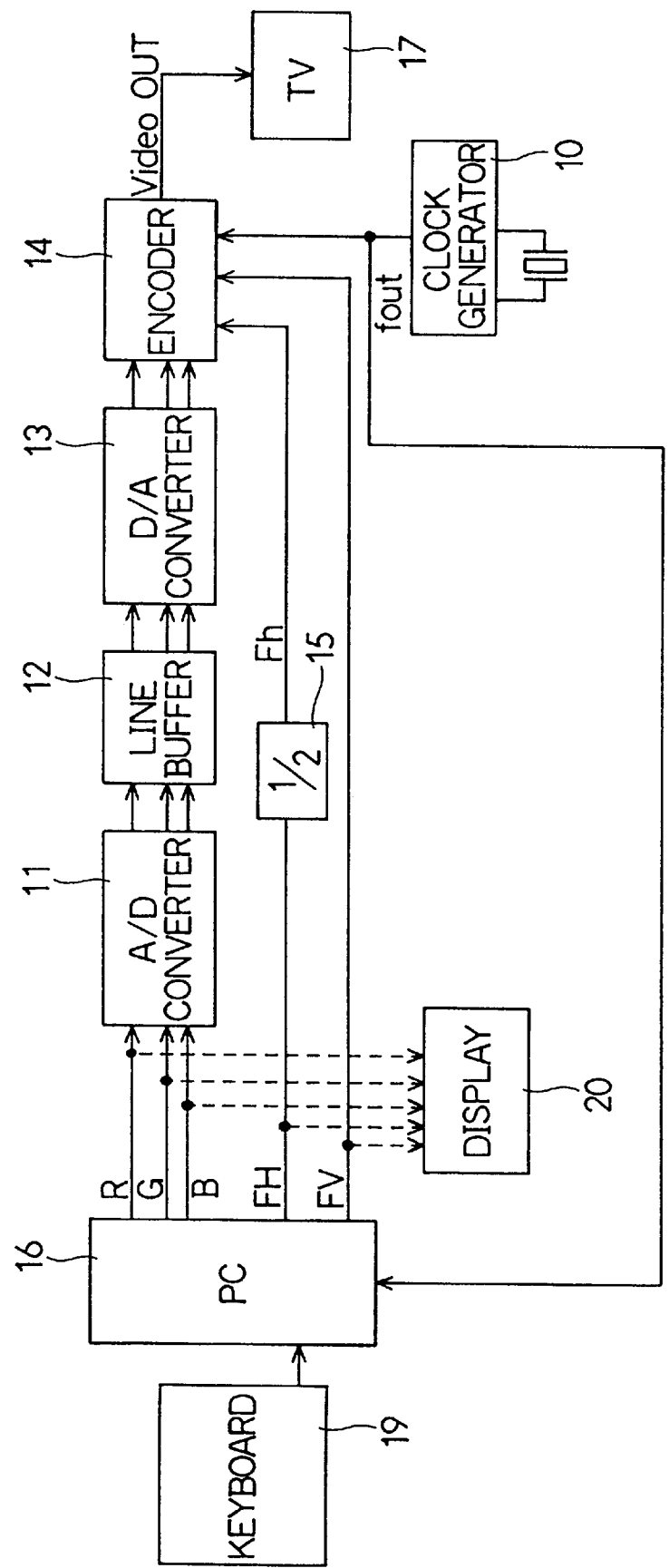
FIG. 3 is a block diagram of a scan converter employing a clock generator of the present invention.

With reference to FIG. 3, a third embodiment of the present invention will be described. FIG. 3 is a block diagram of an example of a scan converter employing a clock generator of the present invention. As described in detail later, the scan converter includes an A/D (analog-to-digital) converter 11, a line buffer 12, a D/A (digital-to-analog) converter 13, an encoder 14, a frequency divider 15, and a clock generator 10. The clock generator 10, which embodies the present invention, generates a pixel clock having a frequency fout, and this pixel clock is fed to the encoder 14 to be used as a pixel clock for a personal computer 16 serving as a graphics processor. The clock generator 10 is usually incorporated into the encoder 14, though it is illustrated as a separate block in the figure for simplicity's sake. The scan converter serves to produce a television signal Video OUT from R, G, and B signals and horizontal and vertical synchronizing signals FH and FV outputted from the personal computer 16. Here, it is assumed that the R, G, and B signals are analog signals, and that the horizontal and vertical synchronizing signals FH and FV are pulse signals consisting of pulses repeated at their respective predetermined frequencies. Pictures outputted from the personal computer 16 contain, for example, an array of horizontally 640 by vertically 480 picture elements per screen.

Normally, the R, G, and B signals and the horizontal and vertical synchronizing signals FH and FV outputted from the personal computer 16 are fed directly to a dedicated monitor 20 to display pictures thereon. In this embodiment, however, the signals outputted from the personal computer 16 are first converted by the scan converter into a television signal Video OUT, which is then fed to a television monitor 7 to display pictures thereon.

The television signal Video OUT outputted as the result of conversion by the encoder 14 is either in the NTSC format or in the PAL format. Whether the television signal Video OUT is to be outputted in the NTSC or PAL format is selected, for example, by feeding a predetermined signal to the personal computer 16 by way of a keyboard 19. In response to such selection operation, the personal computer 16 feeds the clock generator 10 with frequency-division data M, N, and P. That is, here, the personal computer 16 serves as the controller 30 in FIGS. 1 and 2. As a result, from the clock generator 10, a pixel clock having a frequency fout of 12.2727 MHz is generated for the NTSC system and a pixel clock having a frequency fout of 14.2500 MHz is generated for the PAL system. For the NTSC system, which adopts interlaced scanning, the television signal Video OUT is composed such that a total of 525 horizontal scanning lines per screen are scanned alternately as two consecutive fields that, when interlaced with each other, form a complete frame. Moreover, the television signal Video OUT includes horizontal and vertical synchronizing signals, having frequencies of 15.734 kHz and 59.95 Hz respectively, added thereto.

Figure 4:
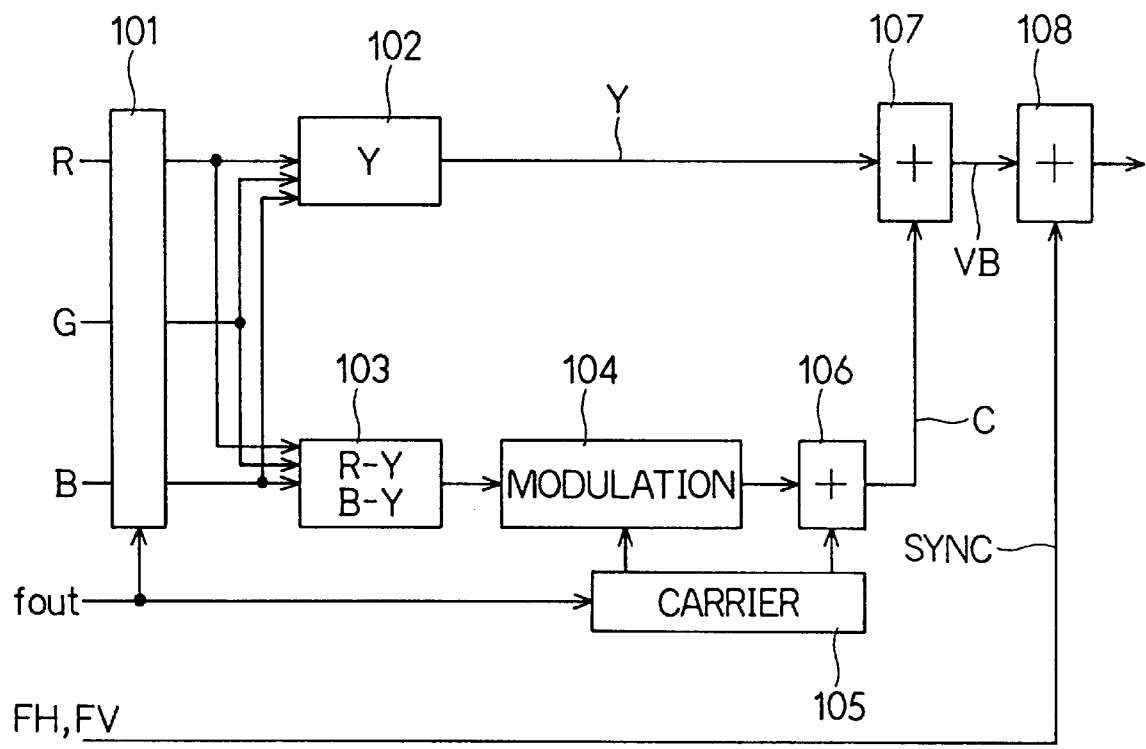
FIG. 4 is a block diagram showing the construction of the encoder in FIG. 3.

FIG. 4 is a block diagram showing the construction of the encoder 14. In FIG. 4, numeral 101 represents a signal input circuit for receiving R, G, and B signals from the outside. Numeral 102 represents a luminance signal forming circuit for forming a luminance signal Y from the R, G, and B signals. Numeral 103 represents a color difference signal forming circuit for forming R-Y and B-Y signals from the R, G, and B signals. The R-Y and B-Y signals outputted from the color difference signal forming circuit 103 are fed to a modulation circuit 104, where they modulate a color carrier fed from a color carrier generating circuit 105 to produce a modulated signal. The modulated signal is then fed to an adder 106, where the color carrier is inserted as color bursts at the color burst positions of the modulated signal to produce a chrominance signal C. Numeral 107 represents an adder for adding together the luminance signal Y and the chrominance signal C to output a color video signal VB. Numeral 108 represents an adder for adding together the color video signal VB and a composite synchronizing signal SYNC, which is composed of horizontal and vertical synchronizing signals and other signals, to output a television signal.

When the encoder 14 converts the R, G, and B signals into a television signal Video OUT for the NTSC system, the frequency of the vertical synchronizing signal FV outputted from the personal computer 16 is 59.94 Hz, i.e. equal to the frequency of the vertical synchronizing signal included in the television signal Video OUT. The frequency of the horizontal synchronizing signal FH outputted from the personal computer 16 is 31.468 kHz, i.e. twice the frequency, 15.734 kHz, of the horizontal synchronizing signal included in the television signal Video OUT. The reason why the horizontal synchronizing signal FH has a frequency of 31.468 kHz is that the signals outputted from the personal computer 16 are intended for non-interlace scanning.

The analog R, G, and B signals outputted from the personal computer 16 are first converted by the A/D converter 11 into digital signals. These digital signals are then stored temporarily in the line buffer 12. Next, the digital signals stored in the line buffer 12 are converted by the D/A converter 13 into analog signals, which are then fed to the encoder 14.

The vertical synchronizing signal FV outputted from the personal computer 16 is fed directly to the encoder 14. The horizontal synchronizing signal FH outputted from the personal computer 16 is first fed to the frequency divider (ratio: 1/2) 15 so that its frequency is converted down to a frequency Fh that is half its original frequency, and is then fed to the encoder 14. Thus, when the horizontal synchronizing signal reaches the encoder 14, it has a frequency Fh of 15.734 kHz required in the NTSC system. The frequency divider 15 is designed to output one pulse for every two pulses it receives.

The encoder 14 receives from the clock generator 10 a pixel clock having a frequency fout of 12.2727 MHz. In synchronism with this pixel clock, the input circuit 101 of the encoder 14 reads in every second scanning line of the analog R, G, and B signals, that is, in a way that conforms to the interlaced scanning method. The R, G, and B signals are then converted by the circuits 102 and 103 into a luminance signal and a chrominance signal. The carrier generating circuit 105 multiplies the frequency 12.2727 MHz of the pixel clock $7/24$ times to produce a color carrier having a frequency of 3.579545 MHz; for the PAL system, which will be discussed later, it multiplies the frequency 14.7500 MHz of the pixel clock $52/173$ times to produce a color carrier having a frequency of 4.433526 MHz. The modulation circuit 104 modulates this color carrier with the R-Y and B-Y signals. The adder 106 adds the color carrier to the signal outputted from the modulation circuit 104 at its color burst positions. Then, to the resulting color signal, the adder 108 adds the horizontal synchronizing signal Fh and the vertical synchronizing signal FV. In this way, the encoder 14, in synchronism with the pixel clock generated by the clock generator 10, converts the R, G, and B signals into a television signal Video OUT for the NTSC system. Here, since the pixel clock generated by the clock generator 10 has a frequency fout of 12.2727 MHz, the television signal Video OUT is so composed that one scanning line contains 780 picture elements.

On the other hand, when the encoder 14 converts the R, G, and B signals into a television signal Video OUT for the PAL system, it operates as follows. For the PAL system, which adopts interlaced scanning, the television signal Video OUT is composed such that a total of 625 horizontal scanning lines per screen are scanned alternately as two consecutive fields that, when interlaced with each other, form a complete frame. Moreover, the television signal Video OUT includes horizontal and vertical synchronizing signals, having frequencies of 15.625 kHz and 50 Hz respectively, superposed thereon. In this case, the horizontal and vertical synchronizing signals FH and V outputted from the personal computer 16 need to have frequencies of 31,250 Hz and 50 Hz, respectively, to enable the encoder 14 to convert the R, G, and B signals properly into a television signal Video OUT for the PAL system.

Here, since the frequency fout of the pixel clock is 14.7500 MHz, the encoder 14 converts the R, G, and B signals into a television signal Video OUT such that one scanning line contains 944 picture elements. Moreover, since the PAL system uses a different aspect ratio from the NTSC system, one scanning line is divided into a larger number of picture elements in the former than in the latter. In this way, the scan converter converts the R, G, and B signals outputted from the personal computer 16 into a video signal for both the NTSC system and the PAL system. A clock generator according to the present invention, however, can be employed not only in scan converters, but also in various video signal processing apparatus that process video signals for the NTSC and PAL systems.

According to the present invention, a video signal processing apparatus processes signals representing picture elements for the NTSC or PAL system in synchronism with a pixel clock generated by a clock generator. The clock generator for generating the pixel clock employs a PLL circuit, so that the frequency division ratio of the frequency divider in the PLL circuit can be changed between the NTSC and PAL systems. As a result, the clock generator generates different pixel clocks for the NTSC and PAL systems. This makes the video signal processing apparatus capable of processing video signals for both of the NTSC and PAL systems. Consequently, as compared with conventional video signal processing apparatus that require separate clock generators to generate different pixel clocks for the NTSC and PAL systems, the video signal processing apparatus of the present invention, since it employs only one clock generator that can generate different pixel clocks for the two systems, can be produced at lower cost.

What is claimed is:

1. A signal processing apparatus functioning as a scan converter for converting analog R, G, and B signals outputted from a computer into a television signal that can be displayed on a television monitor, said apparatus comprising:
   a clock generator for generating a clock in accordance with a rate at which picture elements are scanned;
   an analog-to-digital converter for converting the analog R, G, and B signals into digital signals;
   a line buffer for storing an output of the analog-to-digital converter temporarily;
   a digital-to-analog converter for converting an output of the line buffer into analog signals;
   a frequency divider for reducing a frequency of a horizontal synchronizing signal outputted from the computer by half; and
   an encoder which receives the output of the digital-to-analog converter, an output of the frequency divider for reducing the frequency of the horizontal synchronizing signal by half, a vertical synchronizing signal outputted from the computer, and the clock fed from the clock generator, and which, in accordance with which of the NTSC and PAL formats is required, produces from these received signals a television signal in the NTSC or PAL format;
   wherein the clock generator includes:
      a voltage-controlled oscillator for generating the clock;
      a first frequency divider for dividing an output frequency of the voltage-controlled oscillator
      a reference frequency oscillator;
      a second frequency divider for dividing an output frequency of the reference frequency oscillator
      a phase comparator for comparing phases between outputs of the first and second frequency dividers;
      means for applying an output of the phase comparator to the reference frequency oscillator as a control signal; and
      a controller for feeding the first and second frequency dividers with predetermined frequency-division ratios in accordance with which of the NTSC and PAL formats is required.

2. A signal processing apparatus as claimed in claim 1, further comprising a third frequency divider for performing frequency division on an output of the voltage-controlled oscillator to obtain the clock,
   wherein the clock has a frequency determined by the following formula:

$$f_x \times \frac{M}{N \times P}$$

where M, N, and P represent frequency-division ratios of the first, second, and third frequency dividers, respectively, and $f_x$ represents a reference frequency.

3. A signal processing apparatus as claimed in claim 1, wherein the controller is the computer.

4. A signal processing apparatus as claimed in claim 2,
   wherein the encoder includes means for forming color difference signals from the R, G, and B signals, means for modulating a color carrier with the color difference signals, and a color carrier generating circuit, and
   wherein the color carrier generating circuit generates the color carrier by performing frequency division on the clock fed from the clock generator.

5. A signal processing apparatus functioning as a scan converter for converting analog R, G, and B signals outputted from a computer into a television signal that can be displayed on a television monitor, said signal processing apparatus comprising:
   a clock generator for generating a clock in accordance with a rate at which picture elements are scanned;
   an analog-to-digital converter for converting the analog R, G, and B signals into digital signals;
   a line buffer for storing an output of the analog-to-digital converter temporarily;
   a digital-to-analog converter for converting an output of the line buffer into analog signals;
   a frequency divider for reducing a frequency of a horizontal synchronizing signal outputted from the computer by half; and
   an encoder which receives the output of the digital-to-analog converter, an output of the frequency divider for reducing the frequency of the horizontal synchronizing signal by half, a vertical synchronizing signal outputted from the computer, and the clock from the clock generator, and which, in accordance with which of an NTSC and PAL format is required, produces from these received signals a television signal in the NTSC or PAL format.

6. A signal processing apparatus as claimed in claim 5, wherein switching between the NTSC and PAL formats is achieved through operations on the computer, and frequency-division ratios as fed from the computer.

* * * * *